March 26, 1935.  E. C. MERSEREAU  1,995,432
HAND BRAKE MECHANISM
Filed June 21, 1933   3 Sheets-Sheet 1

Inventor
Everard C. Mersereau
by Topp & Powers
Attorneys

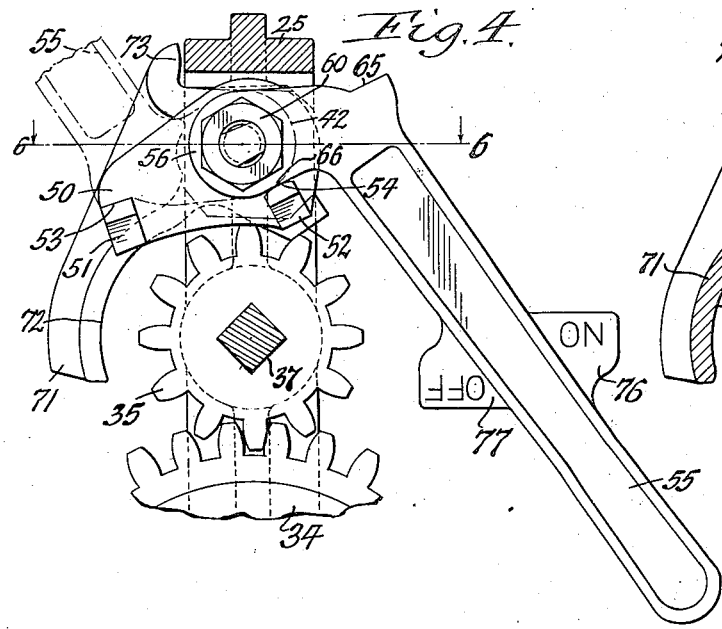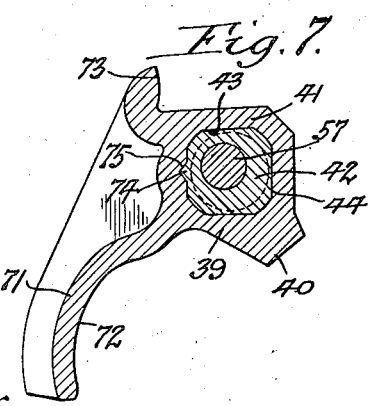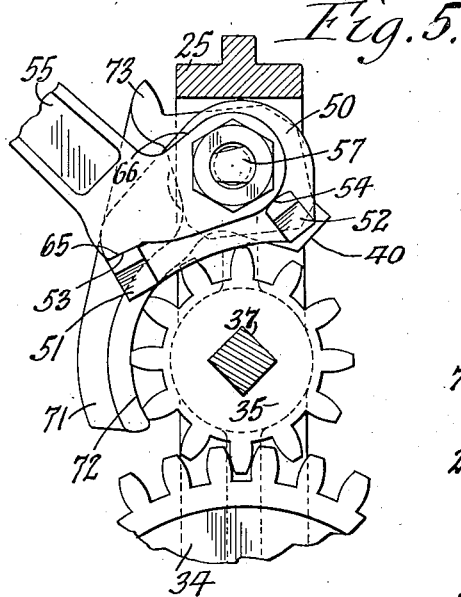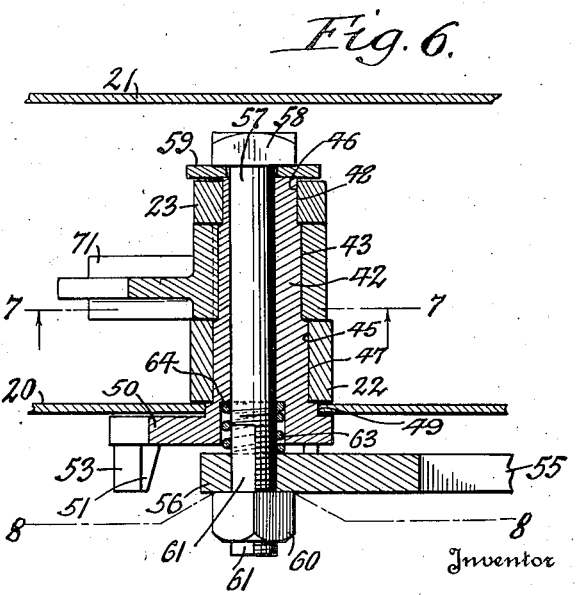

March 26, 1935. E. C. MERSEREAU 1,995,432
HAND BRAKE MECHANISM
Filed June 21, 1933   3 Sheets-Sheet 3
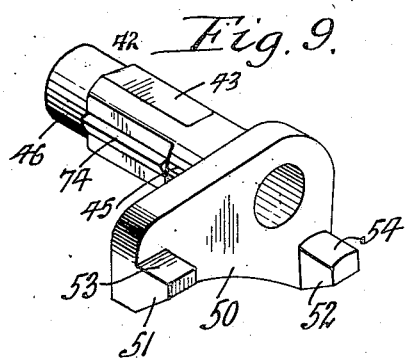
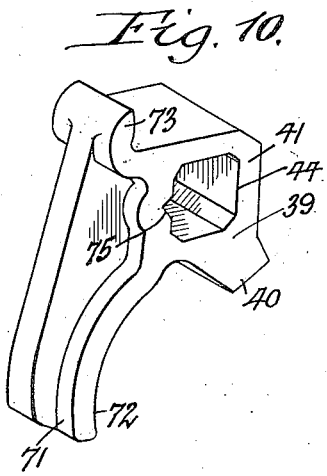
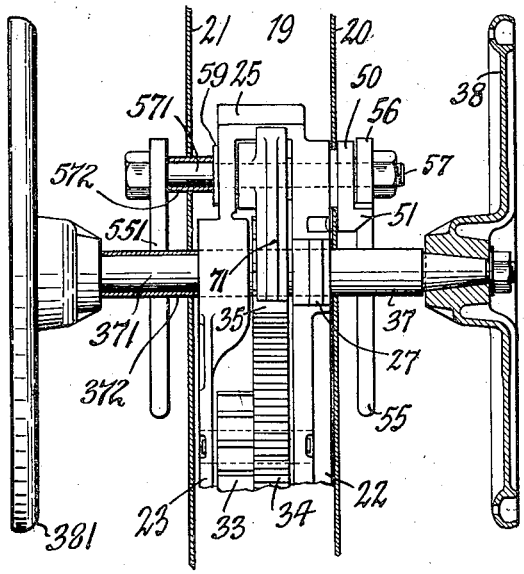
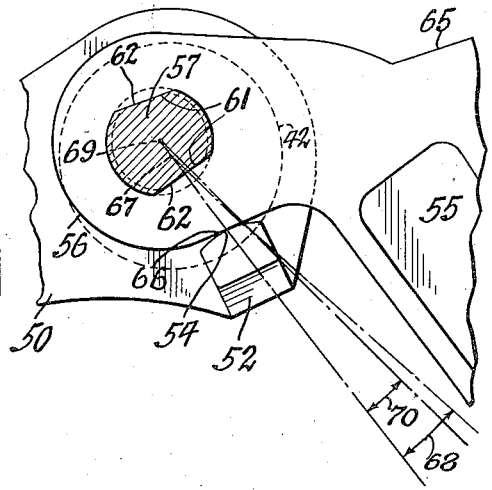
Inventor
Everard C. Mersereau
By Topp & Powers
Attorneys Patented Mar. 26, 1935

1,995,432

UNITED STATES PATENT OFFICE 1,995,432

HAND BRAKE MECHANISM

Everard C. Mersereau, Buffalo, N. Y., assignor to National Brake Company, Inc., Buffalo, N. Y., a corporation of New York Application June 21, 1933, Serial No. 676,866

9 Claims. (Cl. 188—81.1)

This invention relates to a brake mechanism for operating the brake systems of locomotives, freight cars, passenger cars or similar vehicles and is of the type disclosed in Letters Patent of the United States No. 1,487,531 March 18, 1924.

One of the objects of this invention is to provide a brake mechanism of this character which is so organized that the vibration of the trip lever, when the brake mechanism is applied and the car is still in motion, will be reduced to a minimum, if not eliminated altogether, and thereby reduce the wear on the parts and also avoid unnecessary noise.

Another object of this invention is to provide means for checking or retarding the releasing action of the brake mechanism and also to hold the brake mechanism reliably in its applied position.

A further object of this invention is to provide means whereby the parts cannot be assembled in a wrong position relatively to one another either when making the original installation or when restoring the parts after making repairs.

A still further object of this invention is to provide means for preventing undue movement of the detent pawl while engaging the same with the ratchet wheel and thus preventing a locking action between the detent pawl and the ratchet wheel after the parts become loose due to wear or other causes.

Figure 2:
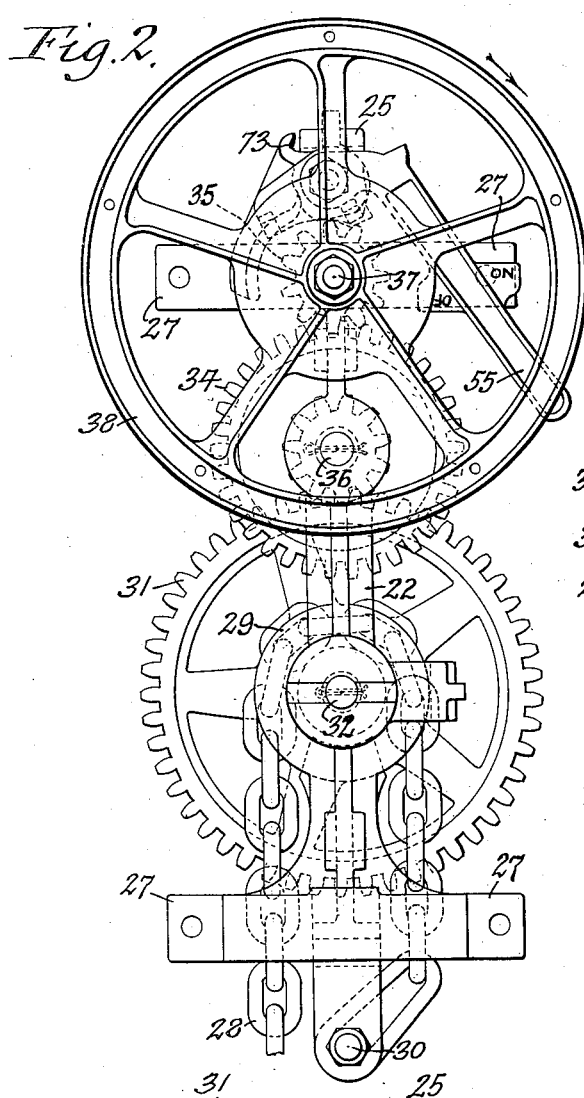
Figure 2 is a front elevation thereof with the car wall omitted.
Figure 1:
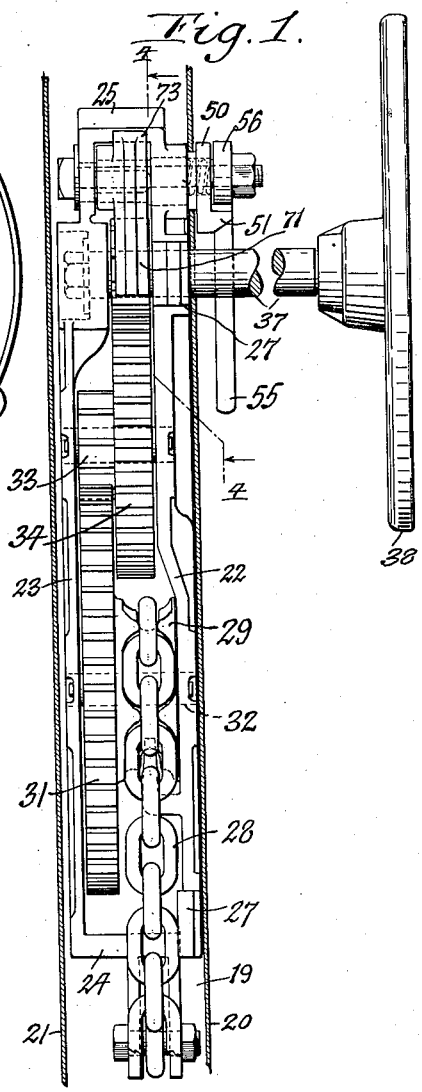
Figure 1 is a vertical section of the end wall of a car or other vehicle equipped with an approved form of my invention.
Figure 3:
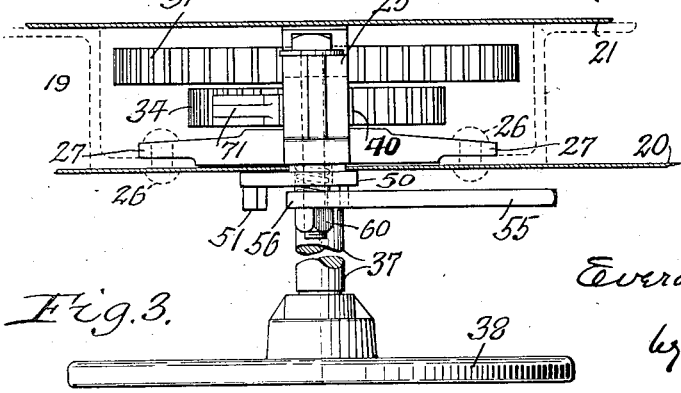
Figure 3 is a top plan view thereof with the car wall shown in section.

Figure 4 is a fragmentary front elevation of my invention on an enlarged scale compared with Figs. 1, 2, 3 and showing the car wall omitted, and the brake frame, and operating or driving shaft shown in section for convenience in illustration, the several parts being shown in this figure in the position which they occupy when the brake mechanism has been applied and the detent pawl is in engagement with the ratchet wheel.

Figure 5 is a view similar to Fig. 4 but showing the position of the parts when the brake mechanism has been released and the detent pawl disengaged from the ratchet wheel and the brake shoe engaged with the ratchet wheel for retarding the backward rotation of the latter.

Figure 6 is a fragmentary horizontal section taken on line 6—6 Fig. 4.

Figure 7 is a vertical transverse section taken on line 7—7 Fig. 6.

Figure 8 is a fragmentary vertical cross section, on an enlarged scale, taken on line 8—8 Fig. 6.

Figure 9 is a perspective view of the detent shaft and the stop bracket associated therewith.

Figure 10 is a similar view of the detent pawl and the brake shoe and the limiting stop associated therewith.

Figure 11 is a fragmentary side elevation of the brake mechanism and the adjacent parts of the car wall in section, showing the manner of organizing this invention when the same is intended to be controlled and operated from the inside and outer side of the car wall.

Although this brake mechanism may be installed in cars or similar vehicles of various constructions the same in the present case is shown mounted on an upright car wall having inner and outer shells or sides 20, 21 which may be constructed from sheet metal or other material and which are separated so as to form a space or housing 19 between these shells or sides.

Within this space or housing is arranged the main frame of the brake mechanism which may be of any suitable construction but which, as best shown in Figs. 1, 2 and 3, comprises upright front and rear bars 22, 23, a horizontal longitudinal bar 24 connecting the lower ends of the upright bars 22 and 23, and an upper horizontal longitudinal bar 25 connecting the upper ends of said upright bars 22 and 23. This main frame may be secured in place between the outer and inner shells of the wall in various ways, for example by means of rivets 26 passing through perforated lugs 27 on the upper and lower parts of the main frame and the adjacent shell of the car wall, as indicated by dotted lines in Fig. 3.

The numeral 28 represents the chain which forms part of the brake actuating mechanism and which has a part passing vertically through the housing or space 19 and has its lower end connected with the brake rigging in any suitable or well-known manner, while the upper part of the chain passes in the form of a loop over a brake drum or wheel 29 arranged within the lower part of the main frame of the brake mechanism, and the upper end of the chain being anchored upon the lower part of the main frame by means of an anchor pin 30.

On its rear or inner side the brake drum 29 is connected with a driven gear wheel 31, and the latter together with the brake drum, are journaled on a pivot pin or axle 32 which is supported at its front and rear ends on the front and rear upright bars 22, 23 of the main frame.

Above the brake drum and driven gear wheel is arranged a pair of connected intermediate gear wheels 33, 34, the smaller one 33 of which meshes with the driven gear wheel 31, and the larger one 34 of which meshes on its upper side with a combined driving gear wheel and ratchet wheel 35, said intermediate gear wheels being arranged within the main frame and journaled upon a horizontal longitudinal pin or axle 36 which is supported at its front and rear ends on the bars 22 and 23 on the main frame.

The driving gear or ratchet wheel 35 is of smaller diameter than the intermediate gear wheel 34 and is mounted on a driving or operating shaft 37 which is journaled in suitable bearings on the front and rear bars 22, 23 of the main frame. As shown in Figs. 1 and 3 this operating shaft extends through the outer shell of the car wall and is provided at its front end with a hand wheel 38, which latter is manipulated by the brakeman on the outer side of the car when applying or releasing the brake mechanism.

For the purpose of applying the brakes the brakeman turns the hand wheel 38 in a clockwise direction indicated by the arrow in Fig. 2, thereby winding the chain 28 over the drum 29 and causing the brake shoes to be applied to the wheels of the vehicle. Upon releasing the brake mechanism the hand wheel 38 turns in an anti-clockwise direction and permits the brake chain to unwind from the drum 29 and thereby furnish the necessary slack in the brake rigging to release the brake shoes from the running wheels.

The mechanism thus far described is substantially the same as that disclosed in the U. S. Patent No. 1,487,531 previously referred to.

Those features of construction associated with the foregoing mechanism and embodying my present improvements are constructed and operated as follows:—

The numeral 39 represents a detent pawl arranged above the ratchet gear wheel 35 and having a nose 40 adapted to move into and out of engagement with the teeth of said ratchet gear wheel, and also provided with a hub 41, the bore of which receives a detent shaft 42. The latter is arranged horizontally and lengthwise and provided with a non-circular surface 43 on its periphery which fits the non-circular surface 44 of the bore in the hub 41, whereby this detent shaft and detent pawl are compelled to rotate together. In front and in rear of the non-circular central part 43 of the detent shaft the same is provided with cylindrical bearing surfaces 45, 46 which are journaled in bearings 47, 48 formed in the front and rear upright bars of the main frame, as best shown in Fig. 6. The front end of the detent shaft 42 extends through an opening 49 in the outer shell or side 20 of the car wall and is provided on the outer side of this shell with a transverse bracket 50 which is preferably formed integrally therewith, as indicated in Fig. 6. On the opposite sides of the axis of the detent shaft the bracket is provided with two outwardly projecting lugs 51, 52, the first one 51 of which is provided with a releasing stop surface 53 arranged at a considerable distance from the axis of the detent shaft 42, while the latter lug 52 is provided with a re-entering stop surface 54 which is arranged comparatively close to the axis of the detent shaft. This last-mentioned stop surface 54 is preferably rounded or of cam shape and faces the axis of the detent shaft 42, as shown in Figs. 4, 5 and 8.

In front of the bracket 50 is arranged a trip lever having a comparatively long operating arm or handle 55 and a short hub 56 which projects laterally from the inner end of the handle and is pivotally mounted so as to be capable of turning vertically in a plane parallel with the plane of rotation of the detent pawl.

In the preferred construction this trip lever is pivotally mounted on the detent shaft by means of a horizontal bolt 57 extending lengthwise through the detent shaft 42 and the hub 56 of the trip lever, and provided at its inner or rear end with a head 58 which bears against the rear end of the shaft 42 through the medium of an interposed washer 59, while the nut 60 of this bolt bears against the outer or front side of the trip lever, as best shown in Fig. 6. The trip lever may be compelled to turn with the bolt 57 in any suitable manner but preferably by providing the front end of the bolt with flat faces 61 on its opposite sides, and providing the bore of the trip lever hub 56 with corresponding flat sides 62 so as to fit the flat sides 61, as best shown in Fig. 8. The bolt 57 is held yieldingly in its foremost position in which its head 58 engages with the rear end of the detent shaft 42 through the medium of the washer 59 and the trip lever is yieldingly held against the inner side of the nut 60 by means of a coil spring 63 surrounding the front part of the pivot bolt 57 and bearing at its inner end against a shoulder 64 forming the bottom of a pocket or counter bore in the front end of the detent shaft, while the outer end of this spring bears against the inner side of the trip lever, as shown in Fig. 6.

On opposite sides of its axis the trip lever is provided with two stop surfaces 65 and 66, the first one 65 being a releasing stop of blunt form arranged on one side of the hub of the trip lever, and the latter 66 being of cam-shaped form and arranged on the opposite side of the hub of the trip lever. These releasing and reentering stops of the trip lever are adapted to be engaged alternately with the releasing and re-entering stops of the detent bracket for the purpose of moving the detent pawl out of engagement and into engagement with the teeth of the ratchet gear wheel 35.

As shown by full lines in Fig. 4 the trip lever is swung into its extreme clockwise position over the axis of the detent pawl and downwardly on the right of the same so that it is arranged in a pendant position relative to the axis of the detent pawl. In this position the cam-shaped stop face 66 of the trip lever engages with the cam-shaped face 54 of the re-entering lug 52 of the detent bracket and thereby turns this bracket together with the detent pawl in a clockwise direction, whereby the nose 40 of the detent pawl is engaged with the adjacent teeth of the ratchet gear wheel on one side of a vertical line extending through the ratchet gear wheel and the detent pawl, as shown in Fig. 4, thereby holding the ratchet wheel gear against anti-clockwise movement so that the chain 28 is prevented from unwinding and releasing the brake mechanism.

Upon raising the handle of the trip lever from a pendant position on the right of the axis of the detent pawl and over this axis and toward the left of the same until its releasing stop 65 engages with the releasing stop 53 of the detent bracket, as shown by dotted lines in Fig. 4, such movement of the trip lever at this time is idle and of no effect. Upon, however, continuing the anti-clockwise movement of the trip lever as the same reaches the position shown by dotted lines in Fig. 4 until it reaches a greater depressed position at the left of the axis of the detent lever, as shown by full lines in Fig. 5, the detent bracket and the pawl will be turned in the same direction with the trip lever up to the end of the stroke in this direction, thereby causing the nose of the detent pawl to be lifted out of engagement from the teeth of the ratchet gear wheel, as shown in Fig. 5, thus releasing the latter and permitting the same to turn in an anti-clockwise direction for the purpose of releasing the brake mechanism.

By so organizing the detent pawl operating mechanism that the trip lever assumes a pendant position which is nearly vertical when the detent pawl is engaged with the ratchet gear wheel, the weight of this trip lever and the fact that the same is arranged below a horizontal line eliminates the possibility of any vibratory action of the car due to shocks caused by coupling, switching and other jarring action from jerking the detent lever upwardly and over its axis and accidentally disengaging the detent pawl from the ratchet wheel and releasing the brake mechanism.

By providing the hub of the trip lever and the re-entering lug 52 of the detent bracket with co-operating cam stop surfaces, the weight of the trip lever operates constantly to produce a cam or wedge action on the detent bracket which operates to hold the detent pawl by friction in engagement with the teeth of the ratchet wheel and thus avoids any chattering or vibratory action of the detent pawl relative to the ratchet wheel as would be the case if the re-entering stop of the trip lever were of blunt or abrupt form and engaged with a stop of blunt or abrupt form on the detent bracket, similar to that shown in the U. S. Patent No. 1,487,531 above referred to.

In the preferred construction the pivot bolt 57 of the trip lever is arranged eccentrically with reference to the axis of the detent shaft 42, and this axis of the trip lever is arranged on that side of the axis of the detent shaft which is above and opposite to the side thereof on which the re-entering cam-shaped stop surface 54 is arranged, as best shown in Fig. 8. By this means the transmission of vibrations from the car to the trip lever is reduced to a minimum, if not wholly eliminated, whereby the relative movement of the cooperating stop surfaces 54, 66 of the detent shaft and trip lever is also reduced and the wear on these surfaces as well as the tendency to produce noise is practically eliminated.

For the purpose of explaining this action a diagram, on a somewhat exaggerated scale for the purpose of more clearly illustrating the same, is shown in connection with Fig. 8, which is explained as follows:

Assuming that the axes of the detent pawl and its bracket and the trip lever were co-incident and that the vibrations of the car would cause all of these members to turn about the same axis 67, then the length of the arc of vibration due to engagement between the stop faces 66 and 54 would cause the detent bracket to rock the trip lever a considerable extent, as indicated at 68. When, however, the axis of the trip lever is off-set to the point 69 which is above the axis 67, then the stop face 54 of the bracket engages with the stop face 66 of the trip lever at a greater distance from the axis 69 of the trip lever, which off-set location of the point of engagement between these stop faces 66 and 54 will cause the same length of rocking action of the detent bracket to rock the trip lever to a lesser extent, as indicated at 70. It follows therefore that the vibration of the trip lever is materially reduced, at least to such an extent, that it is negligible and therefore any objectionable vibration of the trip lever is practically eliminated.

Owing to the pendant position of the trip lever on one side of its axis the same operates constantly by gravity to increase the tightness of the wedging joint between the stop faces 54, 66 and to take up any slack or wear between the faces which may occur.

Means are provided for retarding the anti-clockwise rotation of the ratchet wheel upon releasing the brakes and thereby placing such releasing action under better control. In the preferred construction of the means for accomplishing this purpose a detent brake shoe 71 is provided which projects from the detent hub 41 in a direction from that side of its axis opposite to the nose of the pawl 40, which detent shoe is provided with a curved surface 72 adapted to be engaged with and disengaged from the tip of the teeth of the ratchet wheel. Upon turning the detent bracket 50 in a clockwise direction for engaging the nose 40 of the pawl with the ratchet wheel, the brake shoe 71 is disengaged from the ratchet wheel, as shown by full lines in Fig. 4, but when the trip lever and detent bracket are swung into the extreme anti-clockwise position, as shown in Fig. 5, the nose of the detent pawl is disengaged from the ratchet wheel and the brake shoe 71 is engaged with the tips of the adjacent teeth of the ratchet wheel, and thereby operates by frictional contact therewith to retard the anti-clockwise rotation of the ratchet wheel, and thus control the releasing action of the brakes accordingly.

During the normal operation of engaging the nose of the detent pawl with the teeth of the ratchet wheel the engagement of these parts occurs at a considerable distance toward the right of a vertical line drawn through the axis of the ratchet wheel and the detent pawl, as shown in Fig. 4, so that release of the pawl from the ratchet wheel can be effected easily and promptly. When, however, this pawl and the ratchet teeth become worn, and the bearings in which the detent shaft and the driving shaft 37 are journaled become worn, an amount of slack is liable to be produced between these parts which will permit the nose of the detent pawl to move into a position between the axis of the pawl and the ratchet wheel which would be liable to lock these parts together by toggle action, and permit the same to be disengaged or unlocked only with great difficulty. In order therefore to prevent the detent pawl from thus getting too near a line passing through the axis of the pawl and the ratchet wheel, limiting stop means are provided which preferably consist of a limiting stop lug 73 projecting upwardly from the hub of the detent pawl and adjacent to the left hand side of the upper frame cross bar 25.

During the ordinary operation of the brake mechanism when engaging or re-entering the nose of the detent pawl with the ratchet wheel the limiting stop 73 does not engage the frame part 25, in which case the movement of the detent pawl in this direction is limited solely by disengagement with the ratchet wheel, as shown in Fig. 4. If, however, the bearings of the detent shaft and the ratchet wheel and the cooperating nose and teeth of the pawl and ratchet wheel become unduly worn and permit of an undue reentering movement of the detent pawl, then the limiting stop 73 will engage the adjacent frame member 25 and thereby prevent such undue reentering movement of the detent pawl and avoid the objectionable interlocking action which otherwise would occur.

In order to prevent the detent shaft and pawl from being improperly assembled, its periphery and the cooperating bore of the detent pawl are made of irregular form. For instance, this may be accomplished by providing the periphery of the detent shaft 42 with a longitudinal rib 74 which engages with a correspondingly shaped groove 75 in the bore of the detent pawl hub as best shown in Fig. 7.

If desired, the cooperating surfaces of the trip lever and bolt 57 may be made of irregular form so that they can only be assembled in one position relatively to each other, this being accomplished in the present case by making the flat sides 62 of the opening in the hub of the trip lever of converging form, and the flat surfaces 61 of the bolt 57 of corresponding converging form, as shown in Fig. 8.

By thus permitting the assemblage of the detent shaft and detent pawl in only one position and also rendering it impossible to assemble the trip lever and the pivot bolt in only one position reassembling of these parts after repairs of adjustments, is facilitated and improper assemblage of the parts is avoided.

In order to guide the brakeman in selecting the position of the trip bar for either applying or releasing the brakes, indicating means are provided which in the present case consist of two indicating lugs 76, 77 arranged on opposite sides of the handle of the trip lever, and one of which bears the word On which is upright to indicate that the detent mechanism is in an applying position, and the other bearing the word Off which is upright when the detent mechanism is in a releasing position so that the brakeman can readily observe the condition of the detent mechanism when approaching the same.

In order to enable the brake mechanism to be operated and controlled from the interior of the car body as well as the exterior thereof, the driving shaft 37 may be extended inwardly through the inner side or shell 21 of the car wall, as shown at 371 in Fig. 11, and provided with an additional inner hand wheel 381, and the pivot bolt 57 may be likewise extended through said inner side or shell 21 of the car wall, as shown at 571, and provided with an additional trip lever 551 as shown in Fig. 11. In this case the driving gear wheel or ratchet wheel 35 may be actuated from either side of the car wall to suit different conditions or requirements and the detent bracket will be operated either directly by the front or outer trip lever and/or indirectly through the rear or inner trip lever.

In this modified form of my invention a spacing sleeve 372 surrounds the shaft extension 371 between the hub of the inner hand wheel 381 and the frame bar 23, and a spacing sleeve 571 surrounds the bolt 571 between the inner trip lever 551 and the washer 59, as shown in Fig. 11.

I claim as my invention:

1. A hand brake mechanism including a toothed ratchet wheel, pivoted detent pawl having a nose adapted to engage with the teeth of said ratchet wheel, a detent shaft connected with said pawl, a bracket connected with said shaft and provided on opposite sides of its axis with a releasing stop and a re-entering stop, and a trip lever pivoted on said detent shaft and having releasing and re-entering stops on opposite sides of its axis which are adapted to engage alternately with the releasing and re-entering stops of said bracket, the co-operating faces of the re-entering stops on said bracket and lever which are engaged when the pawl is engaged with said ratchet wheel being of cam formation to produce a cam or wedge action.

2. A hand brake mechanism including a toothed ratchet wheel, a pivoted detent pawl having a nose adapted to engage with the teeth of said ratchet wheel, a detent shaft connected with said pawl, a bracket connected with said shaft and provided on opposite sides of its axis with a releasing stop and a re-entering stop, and a trip lever pivoted on said detent shaft and having releasing and re-entering stops on opposite sides of its axis which are adapted to engage alternately with the releasing and re-entering stops of said bracket, the co-operating faces of the re-entering stops on said bracket and lever which are engaged when the pawl is engaged with said ratchet wheel being of cam formation to produce a cam or wedge action, and the axis of said lever being off-set from the axis of said shaft and pawl and arranged on that side of the latter opposite to the place of engagement of said re-entering stops.

3. A hand brake mechanism comprising a toothed ratchet wheel, a pivoted detent pawl having a nose adapted to be engaged with and disengaged from the teeth of said ratchet wheel and provided with a hub, a detent shaft upon which said hub is mounted to turn therewith, a bracket arranged on one end of said shaft and provided on opposite sides of its axis with a releasing stop lug and a re-entering stop lug, a bolt journaled in said shaft, and a trip lever connected with one end of said bolt to turn therewith and provided with an abrupt releasing stop face and a cam shaped re-entering stop face which are adapted to engage alternately with said releasing stop lug and re-entering stop lug for disengaging said pawl from or engaging the same with said ratchet wheel.

4. A hand brake mechanism comprising a toothed ratchet wheel, a pivoted detent pawl having a nose adapted to be engaged with and disengaged from the teeth of said ratchet wheel and provided with a hub, a detent shaft upon which said hub is mounted to turn therewith, a bracket arranged on one end of said shaft and provided on opposite sides of its axis with a releasing stop lug and a re-entering stop lug, a bolt journaled in said shaft, and a trip lever connected with one end of said bolt to turn therewith and provided with an abrupt releasing stop face and a cam shaped re-entering stop face which are adapted to engage alternately with said releasing stop lug and re-entering stop lug for disengaging said pawl from or engaging the same with said ratchet wheel, the axis of said bolt being eccentric to and on that side of the axis of said detent shaft opposite to the re-entering stop lug of said bracket.

5. A hand brake mechanism comprising a toothed ratchet wheel, a pivoted detent pawl having a nose adapted to be engaged with and disengaged from the teeth of said ratchet wheel and provided with a hub, a detent shaft upon which said hub is mounted to turn therewith, a bracket arranged on one end of said shaft and provided on opposite sides of its axis with a releasing stop lug and a re-entering stop lug, a bolt journaled in said shaft, and a trip lever connected with one end of said bolt to turn therewith and provided with an abrupt releasing stop face and a cam shaped re-entering stop face which are adapted to engage alternately with said releasing stop lug and re-entering stop lug for disengaging said pawl from or engaging the same with said ratchet wheel, said trip lever having a hub provided with an irregular bore and said bolt having an end of irregular shape fitting the bore of said hub whereby said parts are capable of being assembled only in one relative position.

6. A hand brake mechanism comprising a toothed ratchet wheel, a pivoted detent pawl having a nose adapted to be engaged with and disengaged from the teeth of said ratchet wheel and provided with a hub, a detent shaft upon which said hub is mounted to turn therewith, a bracket arranged on one end of said shaft and provided on opposite sides of its axis with a releasing stop lug and a re-entering stop lug, a bolt journaled in said shaft, a trip lever mounted on one end of said bolt to turn therewith but free to slide thereon to a limited extent, a nut on said bolt engaging with the outer side of said lever, and a spring surrounding said bolt and interposed between one end of said shaft and the inner side of said trip lever.

7. A hand brake mechanism comprising a main frame, a ratchet wheel rotatably mounted on said frame, a detent pawl pivotally mounted on said frame and having a nose movable into and out of engagement with the teeth of said ratchet wheel, and limiting means for limiting the movement of said pawl in the direction for engaging the same with said ratchet wheel.

8. A hand brake mechanism comprising a main frame, a ratchet wheel rotatably mounted on said frame, a detent pawl pivotally mounted on said frame and having a nose movable into and out of engagement with the teeth of said ratchet wheel, and limiting means for limiting the movement of said pawl in the direction for engaging the same with said ratchet wheel, consisting of a limiting stop lug arranged on the upper side of said pawl and adapted to engage with the upper part of said frame in case of undue wear of the parts.

9. A hand brake mechanism comprising a ratchet wheel, a detent pawl having a nose movable into and out of engagement with said ratchet wheel, a detent shaft connected with said detent pawl and having a releasing stop arranged remotely from the axis of said shaft and pawl and a re-entering stop arranged near to said axis, and a trip lever movable at times independently of said shaft and movable at other times in opposite directions with said shaft and pawl and having a stop remote from the axis of said shaft and adapted to engage the remote stop of said detent shaft and a stop near to said axis and adapted to engage the near stop of said shaft.

EVERARD C. MERSEREAU.